US007125208B2

(12) United States Patent  
Schweizer et al.

(10) Patent No.: US 7,125,208 B2
(45) Date of Patent: Oct. 24, 2006

(54) MACHINE TOOL AND TOOL HOLDER FOR SAID MACHINE TOOL

(75) Inventors: Anton Schweizer, Wurmlingen (DE); Dirk Prust, Tuttlingen (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 65 days.

(21) Appl. No.: 10/932,713

(22) Filed: Sep. 2, 2004

(65) Prior Publication Data

US 2005/0095075 A1    May 5, 2005

Related U.S. Application Data

(63) Continuation of application No. PCT/EP03/02023, filed on Feb. 27, 2003.

(30) Foreign Application Priority Data

Mar. 4, 2002 (DE) .............................. 102 10 906

(51) Int. Cl.
*B23C 1/00* (2006.01)
*B23Q 11/10* (2006.01)

(52) U.S. Cl. ..................... 409/136; 409/233

(58) Field of Classification Search ........ 409/135–136, 409/232–234; 408/56–57, 59–61, 239 R
See application file for complete search history.

(56) References Cited

U.S. PATENT DOCUMENTS 5,676,506 A * 10/1997 Sugata ..................... 409/136
5,690,137 A * 11/1997 Yamada ..................... 409/136
6,059,702 A    5/2000 Winkler et al.
6,409,641 B1 * 6/2002 Hashimoto .................. 408/56
6,582,167 B1 * 6/2003 Sugata et al. ............... 409/136
6,648,565 B1 * 11/2003 Schweizer ................. 409/136

FOREIGN PATENT DOCUMENTS

| DE | 42 00 808 A1 | 9/1983 |
| DE | 33 19 618 A1 | 12/1984 |
| DE | 84 30 433.2 | 1/1985 |
| DE | 197 26 942 A1 | 1/1999 |
| DE | 198 15 134 A1 | 10/1999 |
| DE | 198 35 677 A1 | 1/2000 |
| EP | 854008 A1 * | 7/1998 |
| WO | WO-01/03885 A1 * | 1/2001 |

* cited by examiner

*Primary Examiner*—Erica Cadugan
(74) *Attorney, Agent, or Firm*—Harness, Dickey & Pierce, P.L.C.

(57) ABSTRACT

A machine tool has a spindle which has a tool receptacle for an interchangeable tool holder. The tool holder is chucked into the tool receptacle during operation of the machine tool. A first passage having an outlet opening is arranged in the interior of the spindle. The outlet opening opens out inside the tool receptacle. The tool holder has a coolant tube which engages in the outlet opening of the first passage. According to the invention, the first passage comprises a continuous inner tube, the first end of which is connected to a connection for a coolant source and the second end of which is designed for connection to the coolant tube.

16 Claims, 4 Drawing Sheets

MACHINE TOOL AND TOOL HOLDER FOR SAID MACHINE TOOL

RELATED APPLICATION

This application is a continuation of co-pending international patent application PCT/EP03/02023 filed on Feb. 27, 2003 and designating the U.S., which was not published under PCT Article 1(2) in English, and claims priority of German patent application DE 102 10 906 filed on Mar. 4, 2002, which is incorporated herein by reference.

BACKGROUND OF THE INVENTION

1. Field of the Invention

The present invention relates to a machine tool having a spindle which has a tool receptacle for an interchangeable tool holder which is chucked into the tool receptacle during operation of the machine tool and which has a coolant tube for receiving a cooling lubricant, furthermore having a first passage which is arranged in the interior of the spindle and has an outlet opening which opens out inside the tool receptacle, the coolant tube, when a tool holder is chucked, engaging in the outlet opening of the first passage.

The invention also relates to a tool holder for such a machine tool, having an external taper for being chucked into a tool receptacle of the machine tool and having a coolant tube for receiving a cooling lubricant.

2. Related Prior Art

Such a machine tool and a corresponding tool holder are known, for example, from DE 197 26 942 A1.

The known machine tool has a spindle which is rotatably mounted in a spindle housing and on the end face of which a receptacle for the tool holder is provided centrally. The tool holders are standardized as a rule. So-called HSK tool holders, which have a hollow shank taper for being clamped into the tool receptacle, are becoming more common. In this case, the tool receptacle has a chucking system with collets which engage in the interior of the hollow shank taper in order to chuck the tool holder in a rotationally fixed manner. The collets are normally actuated via a collet spigot which is provided on the end of a chucking rod arranged axially in the spindle.

In the known machine tool, an inner passage runs through the spindle in the axial direction. The inner passage opens out with an outlet opening centrally at the base of the tool receptacle, the bottom end of the inner passage being formed by a bore through which the chucking rod passes. A coolant tube of the chucked tool holder engages in the outlet opening formed in this way. This provides a continuous passage through which a cooling lubricant can be directed from a coolant source via the spindle and the tool holder to the tool. The cooling lubricant used in the known machine tool is an oil-water emulsion (CL).

A special aspect in the known machine tool is that the cooling lubricant does not just serve to cool and lubricate the tool during the machining of a workpiece. This is because, during a tool change, when the entire tool holder plus the tool is exchanged as a rule, the cooling lubricant also serves here to clean the tool holder, in particular its external tapered and plane surfaces, of chips and any other dirt particles. To this end, the tool holder is rinsed with the cooling lubricant at least when approaching the tool receptacle.

The known machine tool therefore only needs a single inner passage, which serves to cool and lubricate the tool and also to clean the tool holder. This permits an especially simple and thus cost-effective construction.

In addition to the use of a cooling fluid for cooling and lubricating a tool, it is in principle also known to use "minimum quantity lubrication". In this case, an aerosol, preferably in the form of an oil/air mixture, is used instead of the cooling fluid. As the name already implies, the quantity of cooling lubricant required in the case of minimum quantity lubrication is considerably smaller than when using a cooling fluid.

Now it is desirable to operate a machine tool of the type described above with the simplest possible means, even with minimum quantity lubrication. When putting this into practice, however, it has been found that it is difficult to ensure a continuous and uniform flow of the cooling lubricant. Further investigations have shown that one cause of this is cavities, edges and other irregularities of the inner passage of the known machine tool, in particular in transition and coupling regions. At high speeds of the spindle, the oil from the aerosol collects at such locations and sinks. If the speed of the spindle is reduced or the spindle is braked, for example for a tool change, the oil flows off from the sinking locations, which leads to an increased quantity of oil at the outlet opening of the inner passage. If the spindle is then accelerated again to high speeds, first of all some of the oil supplied in the aerosol collects at the sinking locations. Consequently, the quantity of oil provided at the outlet opening of the inner passage may at first be too small after a tool change. Under unfavourable conditions, there is the risk of the tool and/or of the machined workpiece being damaged as a result.

DE 84 30 433 U1 discloses a machine tool which has a twin-passage system. To cool the tool during the machining of a workpiece, a cooling lubricant is fed via an axially arranged first inner passage. In this known machine tool, however, the inner passage for the cooling lubricant opens out outside the locating space for the tool holder. To clean the tool holder during a tool change, a second inner passage via which compressed air is supplied during the tool change is provided in this known machine tool. The second inner passage opens out centrally at the base of the locating space for the tool holder.

The tool holders of this known machine tool have no coolant tube of the type described above, via which a cooling lubricant is directed to the tool. On the contrary, the document attaches importance to the fact that precisely no cooling lubricant passes into the region of the tool receptacle. In addition, this known machine tool is also not intended for minimum quantity lubrication.

SUMMARY OF THE INVENTION

In view of the above, it is an object of the present invention to equip a machine tool of the type mentioned at the outset for minimum quantity lubrication in a simple manner, a continuous, uniform aerosol flow being ensured.

In the machine tool mentioned at the outset, this object is achieved in that the first passage comprises a continuous inner tube, the first end of which is connected to a connection for a coolant source and the second end of which is designed for connection to the coolant tube.

Furthermore, the object is achieved by a tool holder of the type described at the outset, in which the coolant tube, at its end pointing in the direction of the tool receptacle, is designed for connection to an inner tube opening out in the tool receptacle.

In the machine tool described at the outset, such an inner tube can be inserted in a simple manner through the inner passage present there. The design effort for the conversion of the known machine tool to minimum quantity lubrication is therefore very low. Equally, when building a new machine tool, recourse may be had to the existing concept of the known machine tool. Customers' requests with regard to conventional cooling or minimum quantity lubrication can thus be complied with in a simple yet individual manner. The continuous inner tube can be produced with a continuously smooth inner surface without major difficulties, so that sinking locations for the aerosol are largely avoided. Even coupling regions inside the spindle are thus bridged in a "flush" manner. On the whole, a uniform and continuous aerosol flow is achieved in a simple manner.

Compared with the known machine tool described at the beginning, the clear inside diameter of the inner passage is of course reduced by the inner tube additionally used. Consequently, in the novel machine tool, only a reduced cross section is available for feeding the aerosol. Surprisingly, however, it has been found that the reduced cross section is sufficient in the case of minimum quantity lubrication in order to transport the requisite quantity of aerosol. On the contrary, the reduced cross section even has the advantage that the aerosol is not driven so far outwards even at high rotational speeds. The aerosol is therefore distributed over a smaller radius even at high rotational speeds, which again encourages the desired continuous aerosol flow. In addition, the inner tube, on account of the smaller inside diameter, has a smaller inside area, to which the aerosol can adhere. An initial "disappearance" of aerosol in the machine is also reduced as a result, and thus the desired continuous flow is achieved.

In addition, the solution according to the invention has the advantage that a machine tool equipped for minimum quantity lubrication can also easily be converted again to conventional cooling with cooling fluid. To this end, it is essentially only necessary to remove the inner tube inserted into the inner passage and to connect another coolant source. The customer for the machine tool according to the invention is therefore granted greater flexibility than hitherto.

The said object is therefore completely achieved.

According to a further object, the inner tube, in the chucked state of the tool holder, engages in an inlet opening of the coolant tube.

In this embodiment, a double, as it were interlocked connection between the coolant tube and the first passage running in the spindle is provided. On the one hand, the coolant tube engages into the outlet opening of the first passage. On the other hand, the inner tube engages into the inlet opening of the coolant tube, the inner tube preferably being fastened in the first passage. This mutual engagement leads to a very robust and accurately fitting connection. In addition, the accurately fitting insertion of the tool holder into the tool receptacle and the sealing of the coolant passage extending as an entity from the spindle up to the tool are facilitated.

According to a further object, the coolant tube is sealed off in the first passage via a first annular seal. The first annular seal preferably surrounds the coolant tube on its outside.

This measure promotes in particular the compatibility of the novel arrangement with the known machine tool described at the outset. Consequently, the effort involved in converting from conventional cooling with cooling fluid to minimum quantity lubrication or vice versa is reduced. In addition, in this way, already existing tool holders can be converted in a simple and cost-effective manner for use in the novel machine tool. The compatibility also results in cost savings in the manufacture of novel machine tools having minimum quantity lubrication.

A further advantage is obtained in particular when this measure is combined with the engagement of the inner tube in the inlet opening of the coolant tube. This is because the primary sealing in this case takes place in the region of the inlet opening of the coolant tube. The first annular seal bearing against the outside of the coolant tube thus constitutes a redundancy, which leads to an especially tight closure of the coolant system.

In a further embodiment, the inner tube is connected to the coolant tube via a second annular seal. The second annular seal is preferably arranged in the interior of the coolant tube.

Especially good sealing between the inner tube and the coolant tube is achieved by this development. In addition, the arrangement of the second annular seal in the interior of the coolant tube facilitates the insertion of the tool holder into the tool receptacle.

According to a still further object, the coolant tube has a tubular inner insert, by means of which the second annular seal is fixed.

This development permits simple fitting of tool holders of the type described at the outset or conversion of said tool holders to the present arrangement. This is because the coolant tube of known tool holders is accordingly simply supplemented by the tubular inner insert. Furthermore, this allows the coolant tube to be produced in a customary form and thus cost-effectively. It is only by means of the tubular inner insert, which can be inserted separately, that the coolant tube is optimized for minimum quantity lubrication.

In a further embodiment, the spindle has a chucking rod provided with an inner bore and intended for chucking the tool holder in position, the inner bore of the chucking rod forming the outlet opening of the first passage.

The compatibility of the novel arrangement with the known machine tool described at the outset is further improved by this development. Consequently, the production or conversion costs can be further reduced.

According to an important further object, the spindle also has at least one second passage, which is connected to a source for a cleaning agent, in particular to a compressed-air source.

In this configuration, the machine tool according to the invention has a twin-passage system in which the aerosol and the cleaning agent are directed separately from one another. This development departs from the previous single-passage concept which was pursued in the case of the machine tool described at the outset. The continuity of the aerosol flow is further improved by this measure, since no aerosol is blown out of the system during the tool change. Consequently, the full desired quantity of aerosol is available as soon as machining starts again after a tool change.

According to a further object, the inner tube, at least in sections, has an outside diameter which is smaller than a clear inside diameter of the first passage to the extent that a clear intermediate space remains around the inner tube.

This development enables the second passage mentioned above to be realized in a simple and thus cost-effective manner. This is because the said clear intermediate space can be used as second passage in this development. If the inner tube is removed, one automatically returns to the single-passage concept of the machine tool described at the beginning and the advantages associated therewith. Conversely, insertion of the inner tube automatically results in separation of the passages for the aerosol on the one hand and the cleaning agent on the other hand. This development therefore again reduces the effort involved in a change from minimum quantity lubrication to conventional cooling fluid, and vice versa.

In a further embodiment, at least one side passage having an outlet opening which opens out at a section arranged at the end face of the spindle branches off in the region of the clear intermediate space.

Such a side passage improves the compatibility of the novel machine tool with the known machine tool even further. In the known machine tool, which has a single-passage flushing and cooling system, the side passage forms a bypass, by means of which the cleaning effect during the rinsing of a tool holder introduced as replacement is considerably improved. Consequently, the accuracy of fit and the centring accuracy of the tool holder in the machine tool are also increased. In contrast, in the arrangement proposed here, which leads to a twin-passage system, the side passage, without additional design changes, automatically assumes the function of directing the cleaning agent to the tool holder. Consequently, this development likewise contributes to a reduction in costs.

In addition, the arrangement of the outlet opening of the side passage at a spindle section against which the plane surface of the tool holder bears in the chucked state leads to especially effective cleaning of the tool holder and consequently to an especially high accuracy of fit and centring accuracy.

In a further embodiment, the coolant source is an aerosol source.

This development describes the preferred field of application of the novel machine tool, namely in conjunction with minimum quantity lubrication. In principle, however, the novel machine tool can also be used in conjunction with a conventional cooling fluid. In the case of minimum quantity lubrication with an aerosol, however, the advantages of the invention become especially apparent.

It goes without saying that the abovementioned features and the features still to be explained below can be used not only in the respectively specified combination but also in other combinations or on their own without departing from the scope of the present invention.

BRIEF DESCRIPTION OF THE DRAWINGS

Embodiments of the invention are shown in the drawing and are described in more detail below. In the drawing.

DESCRIPTION OF PREFERRED EMBODIMENTS

Figure 1:
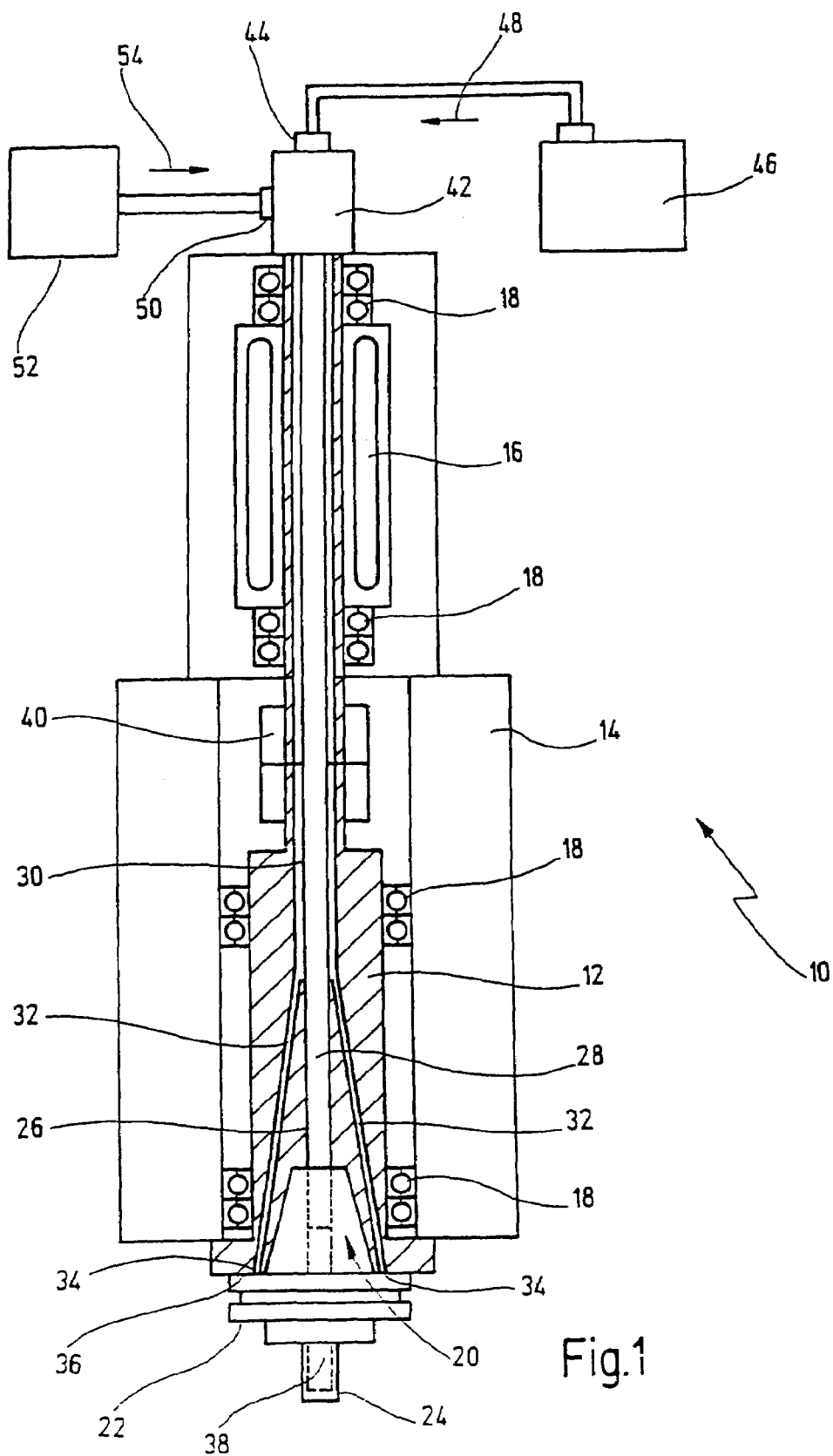
FIG. 1 shows a schematic illustration of the novel machine tool in a partly sectioned view.

A novel machine tool according to the present invention is designated overall by reference numeral 10 in FIG. 1. For the sake of simplicity, essentially only the headstock of the machine tool 10 is shown here. Further elements such as, for example, a rotary table or a work piece feed are known per se and are not shown here for the sake of clarity.

The machine tool 10 has a spindle 12 which is mounted in a spindle housing 14 in a manner known per se. A spindle motor which drives the spindle 12 is designated by reference numeral 16. Radial bearings, with which the spindle motor 16 and the spindle 12 are supported in a conventional manner, are designated by reference numeral 18.

At its bottom end in the illustration in FIG. 1, the spindle 12 has a tool receptacle 20. The latter is a receptacle for tool holders having a "hollow shank taper" (HSK tool holders). The tool holder itself is designated by the reference numeral 22 in the illustration in FIG. 1, and a tool 24 is fastened to its bottom end in a manner known per se.

Designated by the reference numeral 26 is a first passage which extends axially through the entire spindle 12 and the spindle motor 16 arranged above it. Inserted into the first passage 26 is an inner tube 28 which extends continuously over the entire length of the spindle and the spindle motor. In the top region of the spindle 12 and in the region of the spindle motor 16, the outside diameter of the inner tube 28 is smaller than the clear inside diameter of the first passage 26 to such an extent that a clear intermediate space 30 remains. The latter forms a second passage for feeding a cleaning agent. Here, the second passage 30 accordingly surrounds the inner tube 28 concentrically.

In the bottom region of the spindle 12, side passages 32 branch off from the intermediate space 30. It is advantageous if a plurality of side passages 32 branch off in a distributed manner over the periphery of the spindle 12 in order to achieve as uniform a feed of cleaning agent as possible into the region of the tool holder 22.

The side passages 32 each have an outlet opening 34 which opens out at the bottom end face of the spindle 12, i.e. next to the tool receptacle 20. The outlet openings 34 are arranged in such a way that they lie opposite the plane surface 36 of the tool holder 22. The plane surface 36 is important for the exact positioning of the tool holder 22 in the receptacle 20, so that an especially effective cleaning action is achieved by this arrangement of the outlet openings 34.

Designated by the reference numeral 38 is a coolant tube (here only indicated in broken lines) which is arranged in the tool holder 22 in a manner known per se. At its top end in the illustration in FIG. 1, the coolant tube 38 adjoins the inner tube 28 in an accurately fitting manner.

In this embodiment, the inner tube 28 extends in one piece from the bottom end of the spindle 12 over the region of a coupling 40 known per se up to a double rotary leadthrough 42. At its top end, the inner tube 28 is connected to the rotary leadthrough 42. Connected to a first connection 44 of the rotary leadthrough 42 is an aerosol source 46, via which an aerosol can be directed into the inner tube 28 in the direction of an arrow 48. Connected to a second connection 50 of the rotary leadthrough 42 is a compressed-air source 52, via which compressed air can be pumped into the second passage 30 in the direction of an arrow 54.

In the description below of the further figures, the same reference numerals in each case designate the same elements as before.

Figure 2:
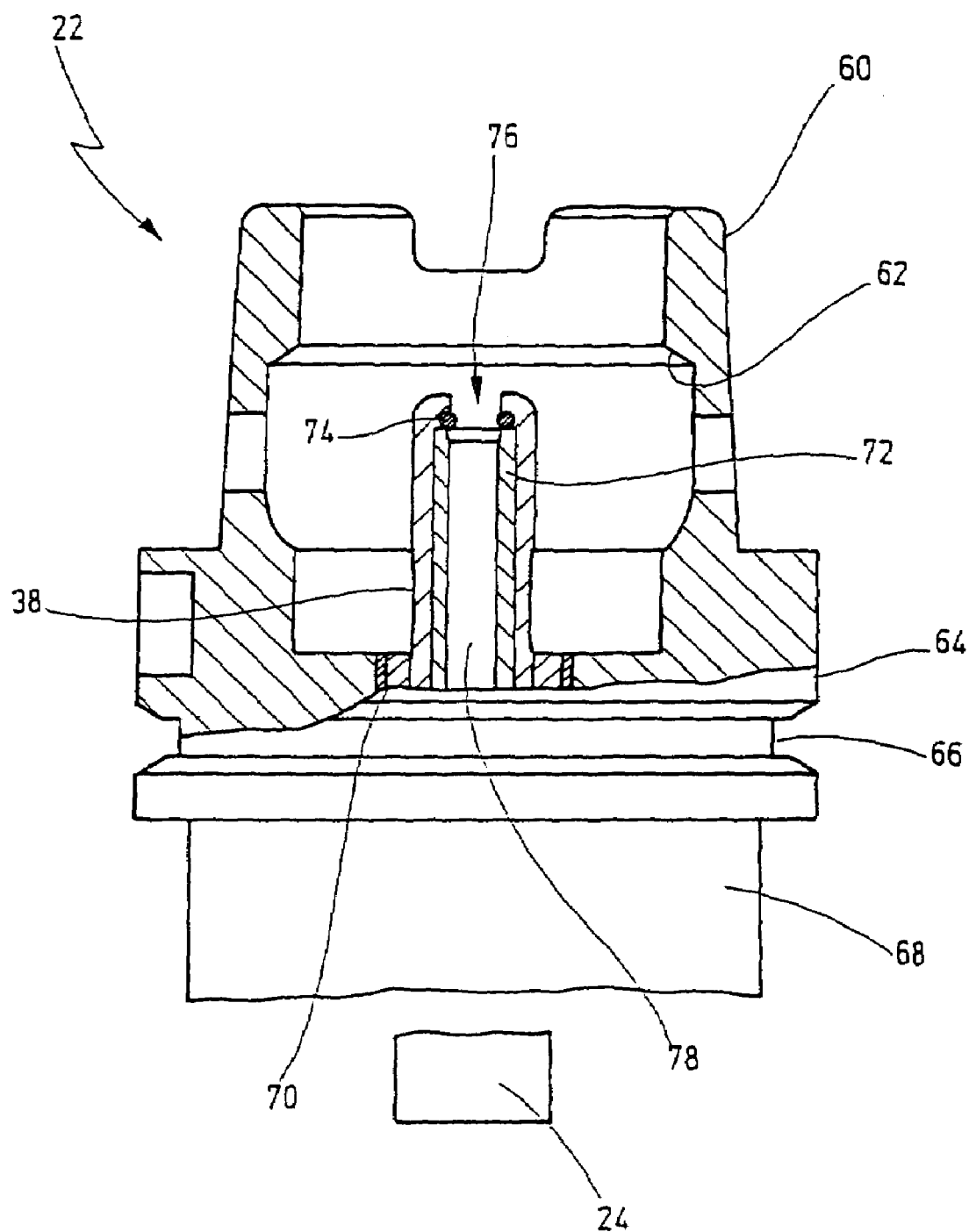
FIG. 2 shows a tool holder for the machine tool from FIG. 1 in a partly sectioned view.

FIG. 2 shows a partly sectioned view of the tool holder 22 used in the machine tool 10. In a manner known per se, the tool holder 22 has a tapered hollow shank 60, on the inside of which an encircling shoulder 62 is formed. Collets of a chucking device arranged in the spindle 12 and described in more detail below engage on the shoulder 62 in the chucked state of the tool holder 22.

Adjoining the tapered hollow shank 60 at the bottom is a collar 64, on which an encircling annular groove 66 is provided slightly further down. The annular groove 66 serves, for example, as a gripping groove for automatic tool-change devices. Following below the annular groove 66 is a holding shank 68, to which tools 24 are fastened in a manner known per se.

The coolant tube 38 is fastened concentrically in the middle of the tapered hollow shank 60. Here, the fastening is effected by a cap nut 70. In the embodiment shown here, a tubular inner insert 72 is arranged in the interior of the coolant tube. The inner insert 72 fixes an annular seal 74 which is provided below the inlet opening 76 of the coolant tube 38. In the coolant tube 38, the tubular inner insert 72 forms a passage 78 which adjoins the inner tube 28 of the spindle 12 in a manner described in more detail below.

Figure 3:
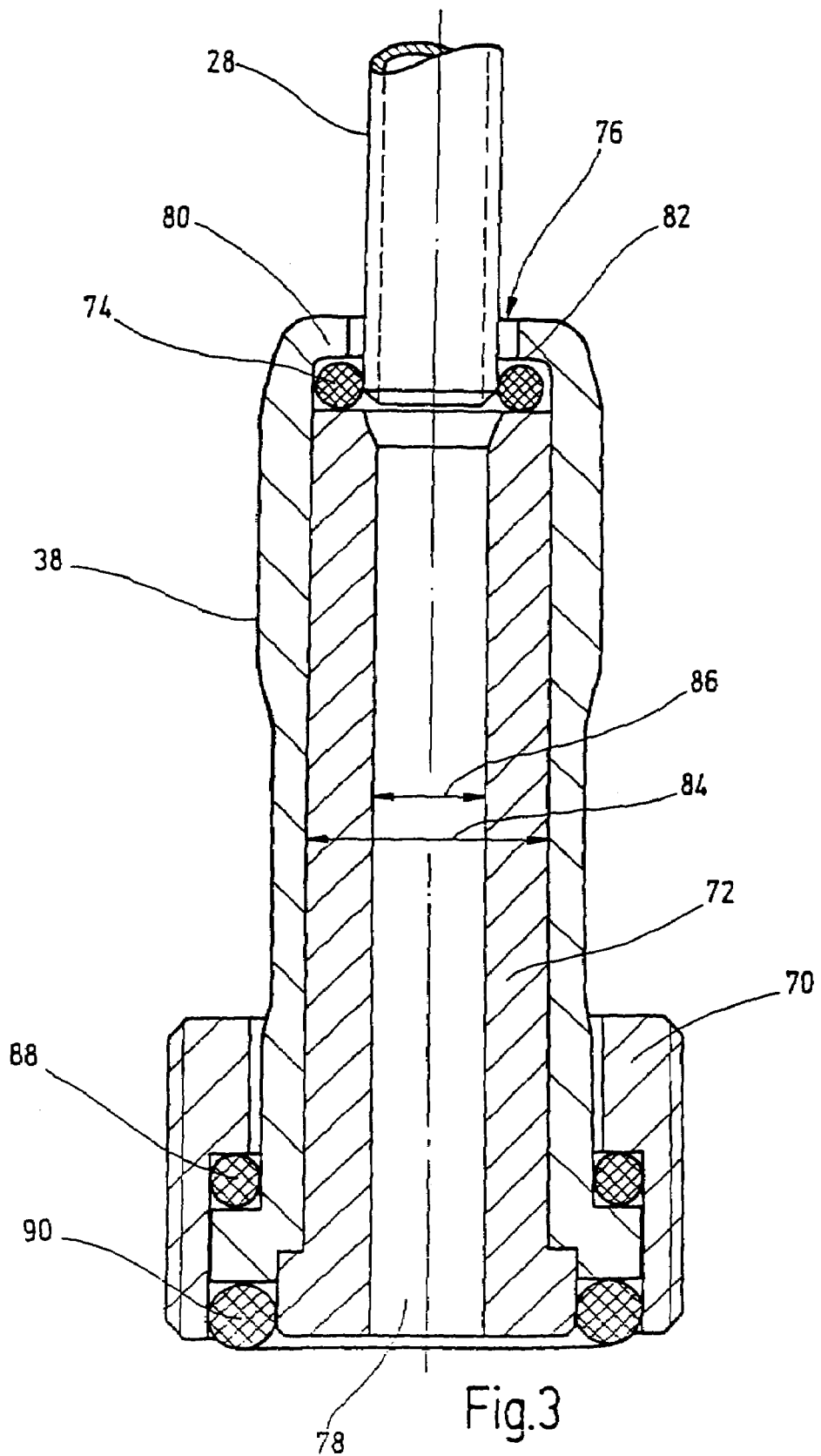
FIG. 3 shows the connection of the coolant tube of the tool holder from FIG. 2 to the inner tube of the machine tool from FIG. 1.

As can be seen from FIG. 3, the coolant tube 38, at its top end, has a margin 80 which projects inwards and surrounds the inlet opening 76. On the inside, the projecting margin 80 forms a shoulder 82. In combination with the tubular inner insert 72, this shoulder 82 fixes the annular seal 74 in the region of the inlet opening 76.

As can also be seen from FIG. 3, the clear inside diameter of the coolant tube 38, which diameter is designated here by reference numeral 84, is reduced by the inner insert 72. Consequently, the passage 78 has a reduced inside diameter, which in FIG. 3 is designated by the reference numeral 86. The inside diameter 86 corresponds approximately to the inside diameter of the inner tube 28, which in the embodiment shown here engages in the inlet opening 76 of the coolant tube 38. Overall, a passage of approximately uniform size is thus provided for the aerosol.

For the sake of completeness, two further annular seals 88 and 90, with which the coolant tube 38 is sealed off in the cap nut 70 and the inner insert 72 is sealed off relative to the coolant tube 38, are also shown in FIG. 3.

Figure 4:
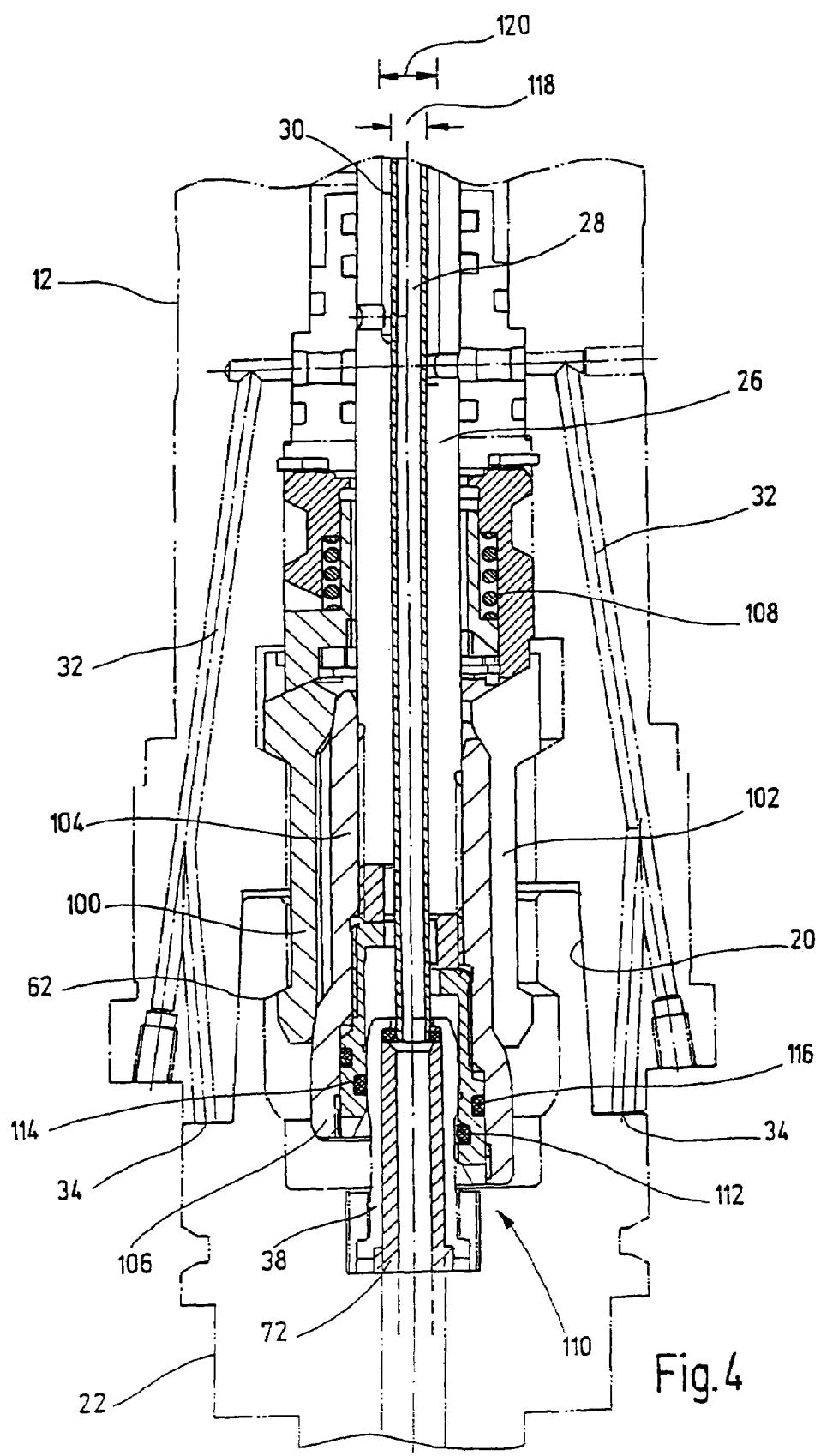
FIG. 4 shows a partly schematic illustration of the novel machine tool with further details.

Further details of the spindle 12 are shown in a partly schematic illustration in FIG. 4. For the sake of clarity, not all the sectioned areas are hatched here. Furthermore, the illustration in FIG. 4 shows two different operating positions of the chucking system known per se for the tool holder 22. Shown in the left-hand part of FIG. 4 is the situation in which the tool holder 22 is chucked in the tool receptacle 20 via a collet 100. In this case, the bottom end of the collet 100 engages on the shoulder 62 in the interior of the tapered hollow shank 60.

In contrast, in the right-hand part of FIG. 4, the collet 102 is shown in the released state. In this situation, the tool holder 22 can be removed from or inserted into the tool receptacle 20.

The chucking system known per se, in addition to the two collets 100, 102, comprises a chucking rod 104, on the bottom end of which a chucking spigot 106 is formed. The chucking rod 104 is pressed downwards via a spring mechanism 108 or is pulled upwards against the spring mechanism 108. In the process, the collets 100, 102 are pressed against the shoulder 62 via the chucking spigot 106, or they release the shoulder 62.

As shown in FIG. 4, the inner hollow chucking rod 104 forms the outlet opening 110 of the first passage 26. The coolant tube 38 engages in this outlet opening 110, as is known per se from the machine tool described at the outset. In addition, however, in the embodiment preferred here, the inner tube 28 also engages in the inlet opening 76 of the coolant tube 38. On its outside, the coolant tube 38 is sealed off relative to the chucking rod 104 via an annular seal 112. In the present case, the annular seal 112 is held by an insert 114, which also carries a further annular seal 116. Especially reliable and effective sealing of the aerosol passage is achieved overall by this arrangement.

Furthermore, for the sake of completeness, the outside diameter (reference numeral 118) of the inner tube 28 and the inside diameter (reference numeral 120) of the first passage 26 are also indicated in FIG. 4. The obvious difference in sizes forms the intermediate space 30, which is used as second passage for the compressed air.

Therefore, what is claimed, is:

1. A machine tool, having a spindle with a tool receptacle for receiving a tool holder having a coolant tube for receiving a cooling lubricant, said tool holder being chucked into the receptacle during operation of said machine tool, said spindle having an interior, a first passage being arranged in said interior, said first passage having an outlet opening that opens out inside said tool receptacle, said outlet opening receiving said coolant tube of said tool holder when said tool holder is chucked into said tool receptacle, said first passage including a continuous inner tube having a first and a second end, said first end being connected to a connection for a coolant source and said second end being arranged for being connected to the coolant tube of the tool holder when the tool holder is chucked into the tool receptacle, wherein an annular seal is provided for connecting said inner tube to said coolant tube when said tool holder is chucked into said tool receptacle, and wherein said coolant tube has a tubular inner insert for fixing said annular seal at said coolant tube.

2. The machine tool of claim 1, wherein the inner tube engages into an inlet opening of said coolant tube when said tool holder is chucked into said tool receptacle.

3. The machine tool of claim 2, wherein said spindle comprises a chucking rod provided with an inner bore, said chucking rod provided for chucking said tool holder into said tool receptacle, said inner bore of said chucking rod forming said outlet opening of said first passage.

4. The machine tool of claim 1, wherein a further annular seal is provided for sealing off the coolant tube when the coolant tube is inserted into said first passage.

5. The machine tool of claim 4, wherein the further annular seal surrounds said coolant tube on its outside.

6. The machine tool of claim 1, wherein said annular seal is arranged within an interior of said coolant tube.

7. The machine tool of claim 1, wherein said spindle comprises a chucking rod provided with an inner bore, said chucking rod provided for chucking said tool holder into said tool receptacle, said inner bore of said chucking rod forming said outlet opening of said first passage.

8. The machine tool of claim 1, wherein said spindle comprises at least one second passage that is connected to a source for a cleaning agent.

9. The machine tool of claim 8, wherein said source for a cleaning agent is a compressed-air source.

10. The machine tool of claim 1, wherein said inner tube has an outside diameter which at least in sections is smaller than a clear inside diameter of said first passage, such that a clear intermediate space is provided around said inner tube.

11. The machine tool of claim 10, wherein at least one side passage branches off in the region of said clear intermediate space, said at least one side passage having an outlet opening which opens out at a section arranged at an end face of said spindle.

12. The machine tool of claim 11, wherein said outlet opening opens out at a section of said spindle against which said tool holder bears with a plane surface when said tool holder is chucked into said tool receptacle.

13. The machine tool of claim 1, wherein the coolant source is an aerosol source.

14. A tool holder for being clamped into a tool receptacle of a machine tool, said tool holder having an external taper for being chucked into said tool receptacle, and having a coolant tube for receiving a cooling lubricant, said coolant tube being designated at its upper free end for being connected with an inner tube of said machine tool opening out in said tool receptacle, wherein said coolant tube has an inlet opening into which said inner tube of said machine tool engages when said tool holder is chucked into said tool receptacle, wherein said coolant tube has an annular seal in the region of its inlet opening, and wherein said coolant tube has a tubular inner insert fixing said annular seal within said coolant tube.

15. A machine tool, having a spindle with a tool receptacle for receiving a tool holder having a coolant tube for receiving a cooling lubricant when said tool holder is chucked into the receptacle during operation of said machine tool, said spindle having an interior, a first passage being arranged in said interior, said first passage having an outlet opening that opens out inside said tool receptacle, said outlet opening receiving said coolant tube of said tool holder when said tool holder is chucked into said tool receptacle, said first passage including a continuous inner tube having a first and a second end, said first end being connected to a connection for a coolant source and said second end being arranged for being connected to the coolant tube of the tool holder when the tool holder is chucked into the tool receptacle, wherein said inner tube has an outside diameter which at least in sections is smaller than a clear inside diameter of said first passage, such that a clear intermediate space is provided around said inner tube, and wherein at least one side passage branches off in the region of said clear intermediate space, said at least one side passage having an outlet opening which opens out at a section arranged at an end face of said spindle.

16. The machine tool of claim 15, wherein said outlet opening opens out at a section of said spindle against which said tool holder bears with a plane surface when said tool holder is chucked into said tool receptacle.

* * * * *